United States Patent [19]

Pate

[11] Patent Number: 4,646,998
[45] Date of Patent: Mar. 3, 1987

[54] WALL-MOUNTED SHELF SUPPORT CLIP

[75] Inventor: Ebb W. Pate, Ocala, Fla.

[73] Assignee: Clairson International Corporation, Ocala, Fla.

[21] Appl. No.: 323,450

[22] Filed: Nov. 20, 1981

[51] Int. Cl.⁴ .............................................. E04G 3/08
[52] U.S. Cl. ..................................... 248/250; 248/49; 248/251
[58] Field of Search ............... 248/250, 49, 73, 74.3, 248/74.8, 74.7, 74.1, DIG. 5, 311.2, 313, 251, 71, 205 B, 271, 239, 544; 24/257

[56] References Cited

U.S. PATENT DOCUMENTS

| | | | |
|---|---|---|---|
| 1,137,069 | 4/1915 | McIntyre | 248/73 |
| 1,168,257 | 1/1916 | Kennedy | |
| 2,154,046 | 4/1939 | Kost | 248/73 |
| 3,005,645 | 10/1961 | Leverette | 248/205 B |
| 3,070,235 | 12/1962 | Manzardo | 211/13 |
| 3,117,758 | 1/1964 | Bauer | 248/71 |
| 4,072,840 | 2/1978 | Daigle | 248/27.1 |
| 4,112,815 | 9/1978 | Tanaka | 248/73 |
| 4,177,910 | 12/1979 | Gangl | 248/DIG. 5 |
| 4,196,883 | 4/1980 | Einhorn et al. | 248/546 |
| 4,252,289 | 2/1981 | Herb | 248/747 |

FOREIGN PATENT DOCUMENTS 0320872 5/1920 Fed. Rep. of Germany ... 248/205 B
1536030 7/1968 France .

Primary Examiner—Ramon O. Ramirez
Attorney, Agent, or Firm—Oltman and Flynn

[57] ABSTRACT

A wall-mounted plastic clip for holding a horizontal rod on the back edge of a ventilated closet shelf has a vertical segment for engagement with the support wall, a hook segment curving forward and upward from the vertical segment and defining with it an upwardly-facing recess for snugly receiving the back edge rod of the shelf, and a flexible and resilient fin inclined forward and downward from the vertical segment and having its lower free end closely overlying the recess to retain the inserted edge rod of the shelf in the recess.

8 Claims, 4 Drawing Figures

WALL-MOUNTED SHELF SUPPORT CLIP

SUMMARY OF THE INVENTION

This invention relates to a clip for attachment to a wall to support a shelf, particularly a ventilated closet shelf of the general type shown in U.S. Pat. No. 3,598,064.

In accordance with the present invention, a wall-mounted clip presents an upwardly-facing recess at the front for snugly receiving a horizontal rod at the back edge of a shelf, and a flexible and resilient fin whose lower free end overlies the shelf edge rod when it is seated in the recess. This fin is bent back when the shelf edge rod is being inserted into the clip recess and it springs out into overlying relationship with the shelf edge rod after the latter is fully seated in the recess to prevent the accidental or inadvertent removal of the shelf from the clip.

A principal object of this invention is to provide a novel wall-mounted support clip for a shelf which is constructed to retain the shelf in place on the clip.

Another object of this invention is to provide such a clip which enables the edge of a shelf to be readily inserted in the clip and securely retained therein against accidental or inadvertent removal.

Further objects and advantages of this invention will appear from the following description and appended claims, reference being had to the accompanying drawing forming a part of this specification wherein like reference characters designate corresponding parts in the several views.

Before explaining the disclosed embodiment of the present invention in detail, it is to be understood that the invention is not limited in its application to the details of the particular embodiment shown. Also, the terminology used herein is for the purpose of description and not of limitation.

DETAILED DESCRIPTION

Figure 1:
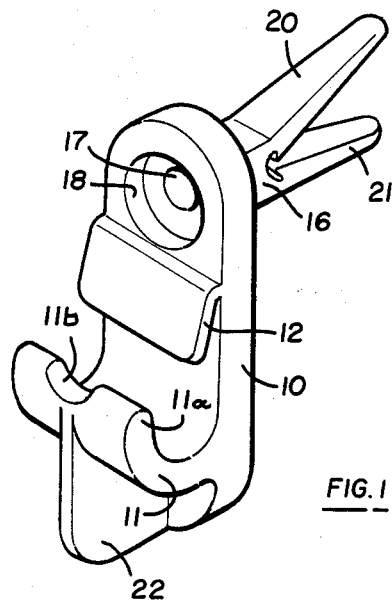
FIG. 1 is a front perspective view of the present support clip.

Referring to FIG. 1, the present clip comprises a generally flat vertical segment 10, a forwardly and upwardly extending hook 11 attached to the front of the vertical segment 10, and a flexible and resilient fin 12 attached to the front of the vertical segment above the hook 11.

Figure 2:
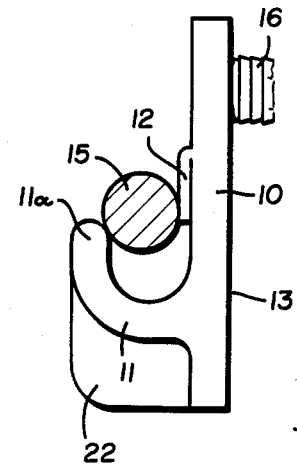
FIG. 2 is an end elevational view of this clip, viewed from the right end of FIG. 1 and with parts broken away and showing the horizontal rod on the back edge of a shelf being inserted into the clip.
Figure 4:
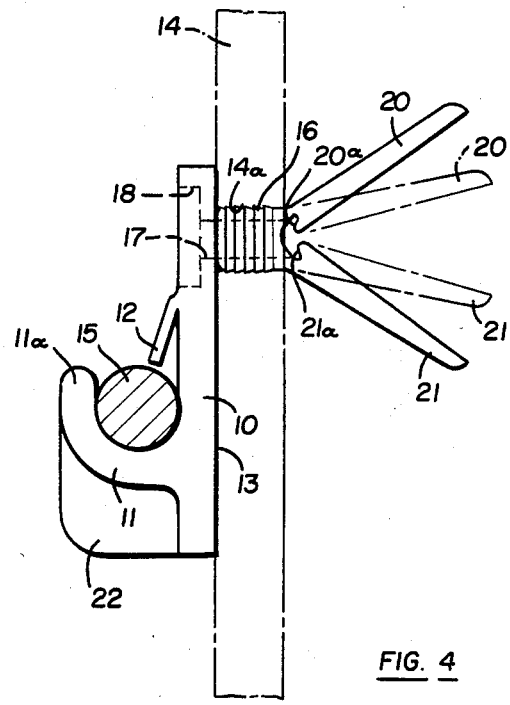
FIG. 4 is an end elevation of the clip mounted on a supporting wall and with the edge rod on the shelf fully inserted in the clip.

As shown in FIGS. 2 and 4, the vertical segment 10 presents a flat back surface 13 for engagement with the front of the wall 14 of a building or other support structure for the clip. Typically, this wall 14 will be the wall of a closet in which several clips in accordance with the present invention will be mounted to support the back edge of a shelf. At its back edge the shelf presents an elongated horizontal rod 15 of circular cross-section which will be seated on the hook segment 11 of the clip and immediately below the fin 12, as explained hereinafter.

In the particular embodiment shown the clip has a horizontal shank segment 16 extending rearward from the vertical segment above the flexible and resilient fin 12. This horizontal segment 16 and the vertical segment 10 in front of it are formed with a cylindrical bore 17 into which the shank of a mounting screw may be threadedly inserted. At the front the vertical segment 10 of the clip is formed with a cylindrical counterbore 18 for receiving the head of the mounting screw.

A pair of flexible and resilient fingers 20 and 21 are joined to the shank segment 16 at its back end above and below the bore 17. The upper finger 20 presents a transverse shoulder 20a extending down from its attachment to the shank segment 16. The lower finger 21 presents a similar upwardly extending transverse shoulder 21a. Normally, as shown in FIG. 1 and in phantom in FIG. 4, the fingers 20 and 21 are resiliently biased apart slightly but they may be squeezed together manually before being inserted in an opening 14a in the wall 14. Preferably, this wall opening has a size and shape such that the shank segment 16 of the clip has a force fit in it. For example, the opening 14a may be originally of circular cross-section while the shank segment 16 of the clip is rectangular in cross-section. Preferably, also, the axial length or the shank segment 16 is substantially equal to the thickness of the wall 14 so that when the back face 13 of the vertical segment 10 of the clip is flush against the wall 14, the fingers 20 and 21 on the clip will assume their undeformed phantom line position in FIG. 4. When the mounting screw is inserted through the bore 17 in the clip it will engage the shoulders 20a and 21a and spread the fingers 20 and 21 apart to the full line position in FIG. 4.

The hook segment 11 on the front of the vertical segment 10 of the clip curves forward and upward from it through a 90° arc and terminates in a straight upper end 11a extending parallel to the vertical segment 10. The inside face of the hook segment 11 and the front face of the vertical segment 10 define a recess which is open at the top and is semi-cylindrical at the bottom to snugly receive the edge rod 15 on the shelf, as shown in FIG. 4.

The clip is formed with a reinforcing rib 22 extending perpendicularly in front of the vertical segment 10 and supporting the hook segment 11 from below midway along its length.

In accordance with the present invention, the flexible and resilient fin 12 normally extends forward and downward at an acute angle in front of the vertical segment 10 of the clip, as shown in FIGS. 1 and 4. When the edge rod 15 on the shelf is being inserted on the hook segment 11 (FIG. 3) it bends the fin 12 back against the vertical segment 10 of the clip. When the edge rod 15 on the shelf is in place in the recess defined by the hook segment 11 and the adjacent front face of the vertical segment 10 of the clip, the fin 12 springs back to its normal undeformed position (FIG. 4) closely overlying the shelf rod 15 to prevent its removal from the recess in the clip. In this position the lower free end of the retainer lip 12 is just slightly above the level of the top of the hook segment 11.

Figure 3:
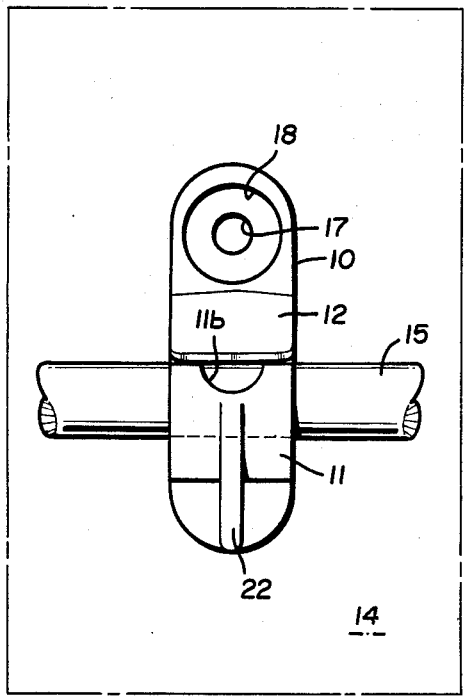
FIG. 3 is a front elevation of the FIG. 2 assembly after the edge rod on the shelf has been fully inserted in the clip.

In order to permit the deliberate removal of the shelf from the clip, the top front edge of the hook segment is formed with a depression 11b at the middle which extends below the level of the bottom edge of fin 12, as shown in FIG. 3. This depression permits the insertion of the tip of a screw driver or the like beneath the fin 12 to lift it up and permit the removal of the edge rod 15 of the shelf from the recess on the front of the clip.

Preferably, the entire clip is formed as a one-piece body of suitable resilient plastic material.

Where the support wall 14 is of wood instead of plaster the shank 16 and fingers 20 and 21 on the clip may be omitted and a wood screw may be inserted through the bore 17 in the front segment 10 of the clip directly into the wall to mount the clip on the wall.

I claim:

1. In a wall-mounted clip for supporting a shelf having a horizontal rod along one edge, said clip having a vertical segment for engagement with the wall and a hook segment extending in front of said vertical segment and defining therewith a recess which is open at the top for receiving the edge rod on the shelf, the improvement which comprises:

a flexible and resilient fin attached to said vertical segment above said hook segment and extending forward and downward therefrom and terminating in a lower free and overlying said recess, said fin being flexibly deformbale toward said vertical segment by the insertion of said edge rod on the shelf down into said recess and springing out from said vertical segment to position its lower free end overlying said edge rod on the shelf when the latter is fully inserted in said recess;

said hook segment terminating at its upper end in a top edge which is exposed across the complete lateral extent of the hook segment in front of said vertical segment, said top edge of said hook segment being spaced completely below the attachment of said fin to said vertical segment.

2. A clip according to claim 1, wherein said lower free end of said fin is located between said vertical segment and the upper end of said hook segment at substantially the level of said top edge of said hook segment.

3. A clip according to claim 2, wherein said hook segment curves outward and upward in front of said vertical segment and defines therewith a recess having a substantially semi-cylindrical bottom wall for snugly receiving the edge rod on the shelf.

4. A clip according to claim 1, and constructed as a one-piece molded plastic body.

5. In a wall-mounted clip for supporting a shelf having a horizontal rod along one edge, said clip having a vertical segment for engagement with the wall and a hook segment extending in front of said vertical segment and defining therewith a recess which is open at the top for receiving the edge rod on the shelf, the improvement which comprises:

a flexible and resilient fin attached to said vertical segment above said hook segment and extending forward and downward therefrom and terminating in a lower free end overlying said recess, said fin being flexibly deformable toward said vertical segment by the insertion of said edge rod on the shelf down into said recess and springing out from said vertical segment to position its lower free end overlying said edge rod on the shelf when the latter is fully inserted in said recess;

a horizontal shank segment extending rearward from said vertical segment above said fin for insertion through an opening in the wall on which the clip is mounted;

said vertical segment and said shank segment being formed with a horizontal bore for receiving a screw;

and a pair of flexible and resilient fingers attached to the back end of said shank segment on opposite sides of said bore therein, said fingers being flexibly deformable toward each other to pass through said wall opening and being spreadable apart by the insertion of a screw through said bore to engage the wall behind the wall opening.

6. A clip according to claim 5 constructed as a one-piece molded plastic body and wherein:

said hook segment curves forward and upward from said vertical segment and defines therewith a recess having a substantially semi-cylindrical bottom wall for snugly receiving the edge rod on the shelf;

and said lower free end of said fin is located between said vertical segment and the upper end of said hook segment at substantially the level of the top of said hook segment.

7. A clip according to claim 6 wherein the upper end of said hook segment is formed with a depression extending below the level of the bottom edge of said fin for passing the tip of a screw driver to lift said fin to permit the removal of said edge rod on the shelf from said recess in the clip.

8. A clip according to claim 1 wherein the upper end of said hook segment at said top edge is formed with a depression extending below the level of the bottom edge of said fin for passing the tip of a screw driver to lift said fin to permit the removal of said edge rod on the shelf from said recess in the clip.

* * * * *